United States Patent
Ikemiya (10) Patent No.: US 9,132,765 B2
(45) Date of Patent: Sep. 15, 2015

(54) TRAILER REFRIGERATING APPARATUS

(75) Inventor: Makoto Ikemiya, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 204 days.

(21) Appl. No.: 13/377,344

(22) PCT Filed: Jun. 4, 2010

(86) PCT No.: PCT/JP2010/003754
§ 371 (c)(1),
(2), (4) Date: Dec. 9, 2011

(87) PCT Pub. No.: WO2010/143391
PCT Pub. Date: Dec. 16, 2010

(65) Prior Publication Data
US 2012/0090342 A1   Apr. 19, 2012

(30) Foreign Application Priority Data
Jun. 10, 2009   (JP) .................................. 2009-139513

(51) Int. Cl.
F25B 47/00   (2006.01)
B60P 3/20   (2006.01)
F25D 11/00   (2006.01)

(52) U.S. Cl.
CPC ................. B60P 3/20 (2013.01); F25D 11/003 (2013.01); *F25B 2500/06* (2013.01)

(58) Field of Classification Search
CPC ............ B60H 1/32; B60P 3/20; F25D 11/003
USPC ......... 62/77, 239, 243, 298, 323.1; 7/77, 239, 7/243, 298, 323.1
See application file for complete search history.

(56) References Cited

U.S. PATENT DOCUMENTS

| | | | | |
|---|---|---|---|---|
| 4,257,240 | A | * | 3/1981 | Christiansen et al. .......... 62/448 |
| 4,748,824 | A | | 6/1988 | Wakabayashi et al. |
| 4,787,215 | A | * | 11/1988 | Bleck et al. ..................... 62/239 |
| 5,678,512 | A | * | 10/1997 | Colton .............................. 123/2 |
| 5,739,675 | A | * | 4/1998 | Green et al. ....................... 322/1 |
| 5,927,090 | A | * | 7/1999 | Ladendorf et al. .............. 62/239 |
| 6,931,884 | B2 | * | 8/2005 | Kolda et al. ..................... 62/449 |
| 2007/0095092 | A1 | * | 5/2007 | Wuerfel .......................... 62/407 |
| 2009/0113914 | A1 | * | 5/2009 | Kitano et al. ................... 62/239 |
| 2009/0250190 | A1 | * | 10/2009 | Siegenthaler ................... 165/42 |

FOREIGN PATENT DOCUMENTS

| | | |
|---|---|---|
| JP | 60-65587 U | 5/1985 |
| JP | 61-194174 U | 12/1986 |
| JP | 62-91773 A | 4/1987 |
| JP | 01-189482 A | 7/1989 |
| JP | 2001-351162 A | 12/2001 |
| JP | 2006-71254 A | 3/2006 |
| JP | 2009-52833 A | 3/2009 |

OTHER PUBLICATIONS

English machine translation of JP-2001-351162, published Dec. 21, 2001.
English machine translation of JP-2009-52833-A, published Mar. 12, 2009.

* cited by examiner

*Primary Examiner* — Cheryl J Tyler
*Assistant Examiner* — Elizabeth Martin
(74) *Attorney, Agent, or Firm* — Birch, Stewart, Kolasch & Birch, LLP (57) ABSTRACT

A casing includes an engine support which is fixed to a main body of the casing and on which an engine generator is mounted. The engine support is drawable from the main body of the casing in a forward direction relative to the front side of the trailer.

5 Claims, 12 Drawing Sheets

TRAILER REFRIGERATING APPARATUS

TECHNICAL FIELD

The present invention relates to a trailer refrigerating apparatus for cooling an in-compartment space of a trailer.

BACKGROUND ART

As a refrigerating apparatus for cooling an inside of a compartment, a trailer refrigerating apparatus for cooling an in-compartment space of a trailer of a refrigerated vehicle has been known. Patent Document 1 discloses the trailer refrigerating apparatus of this type.

The trailer refrigerating apparatus includes a casing attached to an opening at a front end of the trailer and a cooling section supported by the casing and cooling the inside of the compartment. The cooling section is configured by an evaporator connected to a refrigerant circuit. That is, in the trailer refrigerating apparatus, refrigerant circulates in the refrigerant circuit to perform a vapor compression refrigeration cycle. Thus, refrigerant is evaporated by absorbing heat from in-compartment air in the evaporator provided inside the compartment, and, as a result, the in-compartment air is cooled.

In the trailer refrigerating apparatus, an engine generator is mounted on a support of the casing. Specifically, a plurality of frame members each extending in the horizontal direction or the vertical direction are provided in a casing body closing the trailer, and the casing is reinforced. The engine generator is mounted on the frame-shaped support of the horizontally-extending frame member.

CITATION LIST

Patent Document

PATENT DOCUMENT 1: Japanese Patent Publication No. 2009-052833

SUMMARY OF THE INVENTION

Technical Problem

In the trailer refrigerating apparatus disclosed in Patent Document 1, many frame members and other components (e.g., a compressor and an electric component box) are provided in the casing body as described above. Thus, there is a possibility that, when maintenance of the engine generator is performed, working efficiency for maintenance is degraded due to obstacles such as the plurality of frame members and the other components. In order to improve the working efficiency for maintenance, the engine generator may be detached from the casing body. However, since the engine generator has a relatively-high weight, much effort is required for detachment and attachment of the engine generator.

The present invention has been made in view of the foregoing, and it is an objective of the present invention to provide a trailer refrigerating apparatus in which maintenance of an engine generator can be easily performed with speed.

Solution to the Problem

A first aspect of the invention is intended for a trailer refrigerating apparatus including a casing (31) attached to an opening (14) on a front side of a trailer (11); a cooling unit (20a) configured to cool air in an in-compartment space (13) of the trailer (11); and an engine generator (40, 41) configured to supply power to the cooling unit (20a). The casing (31) includes an engine support (60) which is fixed to a main body (50) of the casing (31) and on which the engine generator (40, 41) is mounted, and the engine support (60) is drawable from the main body (50) of the casing (31) in a forward direction relative to the front side of the trailer (11).

In the first aspect of the invention, the casing unit (31) is attached to the opening (14) on the front side of the trailer (11), thereby closing the trailer (11). When the engine generator (40, 41) is operated, power is supplied to the cooling unit (20a). The cooling unit (20a) is operated to cool the in-compartment space (13) of the trailer (11).

In the present invention, the engine support (60) on which the engine generator (40, 41) is mounted is drawable toward front from the main body (50) of the casing (31). Thus, when maintenance of the engine generator (40, 41) is performed by, e.g., a user, the engine support (60) can be drawn out toward the front together with the engine generator (40, 41). Since the engine generator (40, 41) is in a position protruding toward the front relative to the main body (50), the engine generator (40, 41) is less susceptible to obstacles such as a reinforcing member and other components provided in the main body (50) upon the maintenance of the engine generator (40, 41).

In addition, since the engine generator (40, 41) is drawn out toward the front together with the engine support (60), the engine generator (40, 41) having a relatively-high weight can be easily drawn out toward the front.

A second aspect of the invention is intended for the trailer refrigerating apparatus of the first aspect of the invention, in which a guiding member (70) for guiding the engine support (60) in a front-back direction is provided in the casing (31).

In the second aspect of the invention, the guiding member (70) is provided in the casing (31). Thus, while guiding the engine support (60) along the guiding member (70), the engine support (60) can be drawn out toward the front. Consequently, the engine generator (40, 41) having the relatively-high weight can be easily drawn out toward the front. After completion of the maintenance, while guiding the engine support (60) along the guiding member (70), the engine support (60) can be pushed toward the back. Thus, the engine generator (40, 41) having the relatively-high weight can be easily returned to an original position.

A third aspect of the invention is intended for the trailer refrigerating apparatus of the second aspect of the invention, in which a wheel (67) is provided below the engine support (60), and the guiding member is arranged below the engine support (60) and includes a rail groove (70) which extends in the front-back direction and into which the wheel (67) is fitted.

In the third aspect of the invention, the wheel (67) provided below the engine support (60) is fitted into the rail groove (70). Thus, while rotating the wheel (67) along the rail groove (70), the engine support (60) can be drawn out toward the front. Consequently, the engine generator (40, 41) having the relatively-high weight can be easily and smoothly drawn out toward the front. After the completion of the maintenance, while rotating the wheel (67) along the rail groove (70), the engine support (60) can be pushed toward the back. Thus, the engine generator (40, 41) having the relatively-high weight can be returned to the original position.

A fourth aspect of the invention is intended for the trailer refrigerating apparatus of the first aspect of the invention, in which an internal space (83a) extending in a front-back direction and having a substantially rectangular longitudinal section is formed below the engine support (60).

The internal space (83a) is formed below the engine support (60) of the fourth aspect of the invention. The internal space (83a) extends in the front-back direction and is formed so as to have the substantially rectangular longitudinal section. Thus, by inserting, e.g., a fork of a forklift to the internal space (83a), the engine support (60) can be drawn out while supporting the engine support (60) by the forklift.

A fifth aspect of the invention is intended for the trailer refrigerating apparatus of any one of the first to fourth aspects of the invention, in which the engine support (60) is made of an aluminum material.

In the fifth aspect of the invention, since the engine support (60) is made of the aluminum material, the weight of the engine support (60) can be reduced. Thus, in the maintenance of the engine generator (40, 41), the engine support (60) can be more easily drawn out toward the front.

Advantages of the Invention

In the first aspect of the invention, the engine generator (40, 41) having the relatively-high weight can be drawn out toward the front from the main body (50) of the casing (31) together with the engine support (60). Thus, the engine generator (40, 41) is less susceptible to the obstacles such as the reinforcing member and the other components arranged in the main body (50) upon the maintenance of the engine generator (40, 41), thereby improving working efficiency for maintenance.

In particular, in the second aspect of the invention, since the engine support (60) can be guided back and forth along the rail groove (70), easy drawing and/or pushing of the engine support (60) can be ensured.

Further, in the third aspect of the invention, the wheel (67) is provided below the engine support (60), the wheel (67) can rotate along the rail groove (70). Thus, the drawing and/or pushing of the engine support (60) can be more easy.

In the fourth aspect of the invention, since the internal space (83a) extending in the front-back direction is formed below the engine support (60), the fork of the forklift can be inserted to the internal space (83a). Thus, the engine support (60) can be drawn out toward the front by the forklift.

In the fifth aspect of the invention, since the engine support (60) is made of the aluminum material, the weight of the engine support (60) can be reduced. Thus, the more easy drawing and/or pushing of the engine support (60) can be ensured.

DESCRIPTION OF EMBODIMENTS

An embodiment of the present invention will be described below in detail with reference to the drawings.

Figure 1:
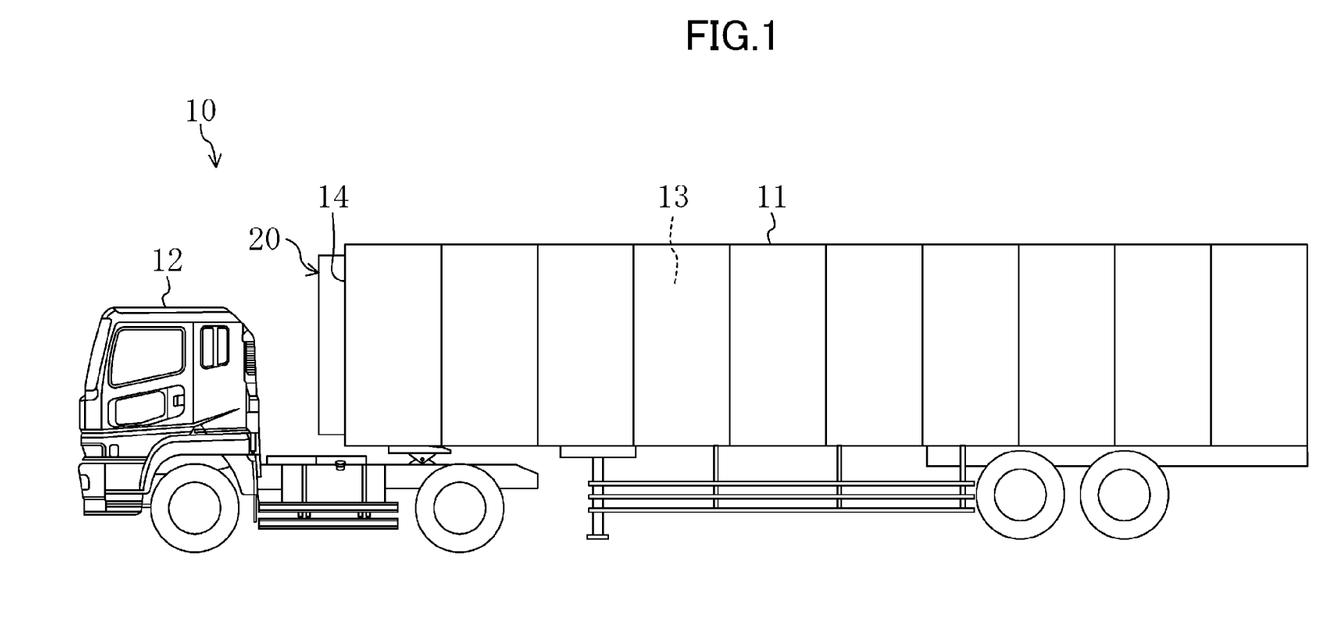
FIG. 1 is a view of an entire configuration of a refrigerated vehicle and a trailer refrigerating apparatus.

As illustrated in FIG. 1, a trailer refrigerating apparatus (20) of the present embodiment is mounted in a refrigerated vehicle (10) for transporting frozen food, fresh food, etc. by road or rail. The refrigerated vehicle (10) includes a trailer (11) in which freight such as frozen food is stored, and a tractor (12) for towing the trailer (11).

Figure 3:
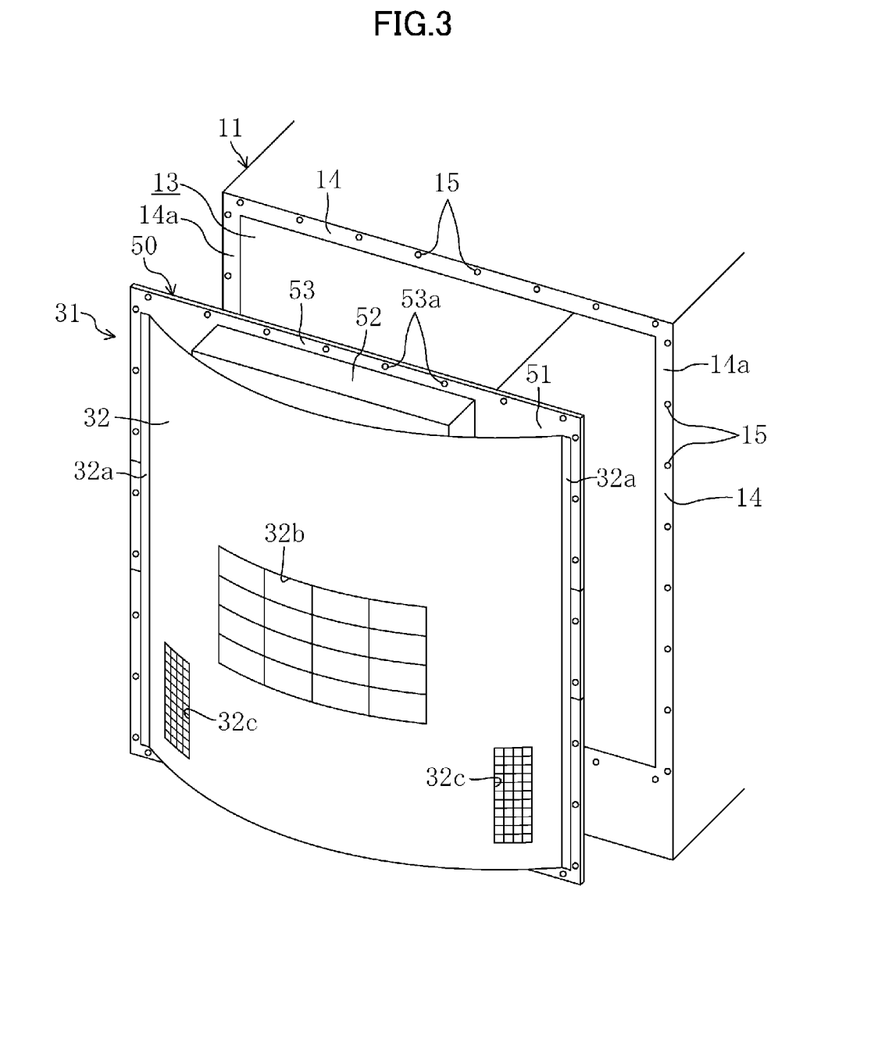
FIG. 3 is a perspective view illustrating an entire configuration of an opening of a trailer and the trailer refrigerating apparatus.

The trailer (11) is formed in an elongated rectangular parallelepiped box shape extending in a front-back direction and opening at a front end. An in-compartment space (13) is formed inside the trailer (11), and frozen food, fresh food, etc. are stored in the in-compartment space (13). As illustrated in FIG. 3, a rectangular frame-shaped opening (14) is formed at the front end of the trailer (11). A plurality of screw fixing portions (15) for attaching the trailer refrigerating apparatus (20) are formed in a front end surface of the opening (14). For example, eight of the plurality of screw fixing portions (15) are arranged at equal intervals in each of four sides of the opening (14).

Configuration of Trailer Refrigerating Apparatus

Figure 2:
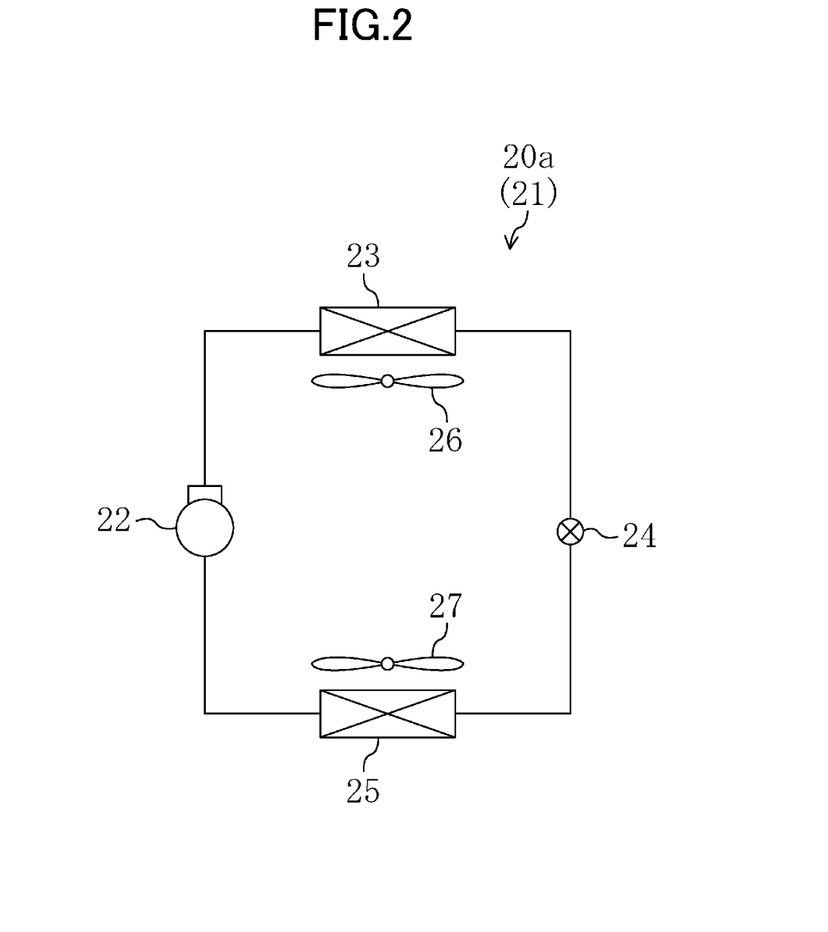
FIG. 2 is a schematic configuration diagram of a refrigerant circuit of the trailer refrigerating apparatus.

The trailer refrigerating apparatus (20) serves as a cooling apparatus for cooling air in the in-compartment space (13) of the refrigerated vehicle (10). As illustrated in FIG. 2, the trailer refrigerating apparatus (20) includes a cooling unit (20a) for cooling the in-compartment space (13) of the trailer (11). The cooling unit (20a) includes a refrigerant circuit (21) filled with refrigerant. In the refrigerant circuit (21), a compressor (22), a condenser (23), an expansion valve (24), and an evaporator (25) are connected together. In the refrigerant circuit (21), refrigerant circulates to perform a vapor compression refrigeration cycle. An outside-compartment fan (26) is provided near the condenser (23). In the condenser (23), heat is exchanged between outside-compartment (outdoor) air delivered by the outside-compartment fan (26) and refrigerant. An in-compartment fan (27) is provided near the evaporator (25). In the evaporator (25), heat is exchanged between in-compartment air delivered by the in-compartment fan (27) and refrigerant. The evaporator (25) serves as a cooling section for cooling air in the in-compartment space (13) of the trailer (11). The expansion valve (24) is configured so that the degree of opening of the expansion valve (24) is adjustable, and serves as a pressure reduction mechanism for reducing the pressure of refrigerant.

As illustrated in FIGS. 3-6, the trailer refrigerating apparatus (20) includes a casing unit (31) attached to the opening (14) of the trailer (11). The casing unit (31) includes a front cover (32), an outside-compartment casing (50), and an in-compartment casing (33).

<Front Cover>

The front cover (32) is detachable from a front surface of the outside-compartment casing (50). The front cover (32) is an arched-plate-shaped member which is curved so that a middle portion of the front cover (32) in a width direction thereof (right-left direction as viewed in FIG. 3) protrudes toward the front. Side portions (32a) at both ends of the front cover (32) in the width direction thereof are held by the outside-compartment casing (50). This forms machine chambers (35, 36) in each of which various components (details will be described later) are accommodated, between a rear surface of the front cover (32) and the front surface of the outside-compartment casing (50).

A single middle inlet (32b) and two side inlets (32c) are provided in the front cover (32). The middle inlet (32b) is formed in substantially the center of the front cover (32). One of the side inlets (32c) is formed closer to a bottom and a left end of the front cover (32), and the other side inlet (32c) is formed closer to the bottom and a right end of the front cover (32).

<Outside-Compartment Casing>

The outside-compartment casing (50) is provided outside the trailer (11), and serves as a main body of the casing unit (casing) (31). The outside-compartment casing (50) is formed in a substantially planar shape so that the outside-compartment casing (50) closes the opening (14) of the trailer (11) and is fixed to an outer edge of the opening (14). The outside-compartment casing (50) is made of an aluminum material. The outside-compartment casing (50) includes a square plate-shaped base (51) and a protrusion (52) formed in an upper portion of the base (51) (see, e.g., FIGS. 4-6).

The base (51) is configured by connecting three plate-shaped separate bodies (51a, 51b, 51c) together in the vertical direction. That is, the base (51) includes the lower base portion (51a) provided closer to a bottom of the base (51), the upper base portion (51b) provided closer to a top of the base (51), and the middle base portion (51c) positioned between the lower base portion (51a) and the upper base portion (51b).

A plurality of bolt holes (53a) into each of which a bolt (16) is inserted are formed in an outer edge portion (53) of the base (51). For example, eight of the plurality of bolt holes (53a) are arranged at equal intervals in each of four sides of the outer edge portion (53) of the base (51). The bolts (16) each inserted into the bolt hole (53a) are screwed in the screw fixing portions (15) in a state in which the outer edge portion (53) of the base (51) and the opening (14) of the trailer (11) closely contact each other, thereby fixing the outside-compartment casing (50) to the trailer (11).

In a state in which the outside-compartment casing (50) is fixed to the trailer (11), the opening (14) of the trailer (11) is closed. That is, the outside-compartment casing (50) functions as a closing member for closing the opening (14) of the trailer (11). In addition, in the state in which the outside-compartment casing (50) is fixed to the trailer (11), the opening (14) of the trailer (11) is reinforced by the outer edge portion (53) of the outside-compartment casing (50). That is, the outside-compartment casing (50) also functions as a reinforcing member of the opening (14) of the trailer (11).

The protrusion (52) is made of an aluminum material so as to be integrally formed with the base (51), and protrudes from the base (51) toward the front. The protrusion (52) is formed in a rectangular parallelepiped box shape which has flat front and rear surfaces and opens on a rear surface side (see FIG. 6). Note that the protrusion (52) may be made of, e.g., a resin material, and may be integrally connected to the base (51).

The outside-compartment casing (50) includes a lower support member (54) and an upper support member (55). The lower support member (54) is provided closer to a lower end of the base (51), and the upper support member (55) is provided in a middle portion of the base (51) in the vertical direction (provided between the lower support member (54) and the protrusion (52)). Each of the support members (54, 55) includes an arch-shaped plate (54a, 55a). The plate (54a, 55a) defines an arc-shaped surface on a front side, and defines a flat surface along a front surface of the base (51) on a rear side. Each of the support members (54, 55) includes a bent portion (54b, 55b) formed by upwardly bending the plate (54a, 55a) at a rear end thereof. The bent portion (54b, 55b) is formed in a plate shape extending in the right-left direction. The bent portion (54b, 55b) is fixed to the base (51) with rivets, thereby fixing each of the support members (54, 55) to the base (51). A communication port (55c) is provided in a middle portion of the plate (55a) of the upper support member (55) in the right-left direction.

In the state in which the front cover (32) is attached to the outside-compartment casing (50), the first machine chamber (35) is defined between the lower support member (54) and the upper support member (55). In addition, the second machine chamber (36) is defined above the upper support member (55). The first machine chamber (35) and the second machine chamber (36) are communicated with each other through the communication port (55c) of the upper support member (55). In addition, the first machine chamber (35) is communicated with the two side inlets (32c), and the second machine chamber (36) is communicated with the middle inlet (32b).

The outside-compartment casing (50) includes two lower pillars (56) and two upper pillars (57). The lower pillars (56) are interposed between the lower support member (54) and the upper support member (55). The upper pillars (57) are interposed between the upper support member (55) and the protrusion (52). Each of the pillars (56, 57) is made of an aluminum material, and is formed in a vertically-extending prism shape.

Figure 5:
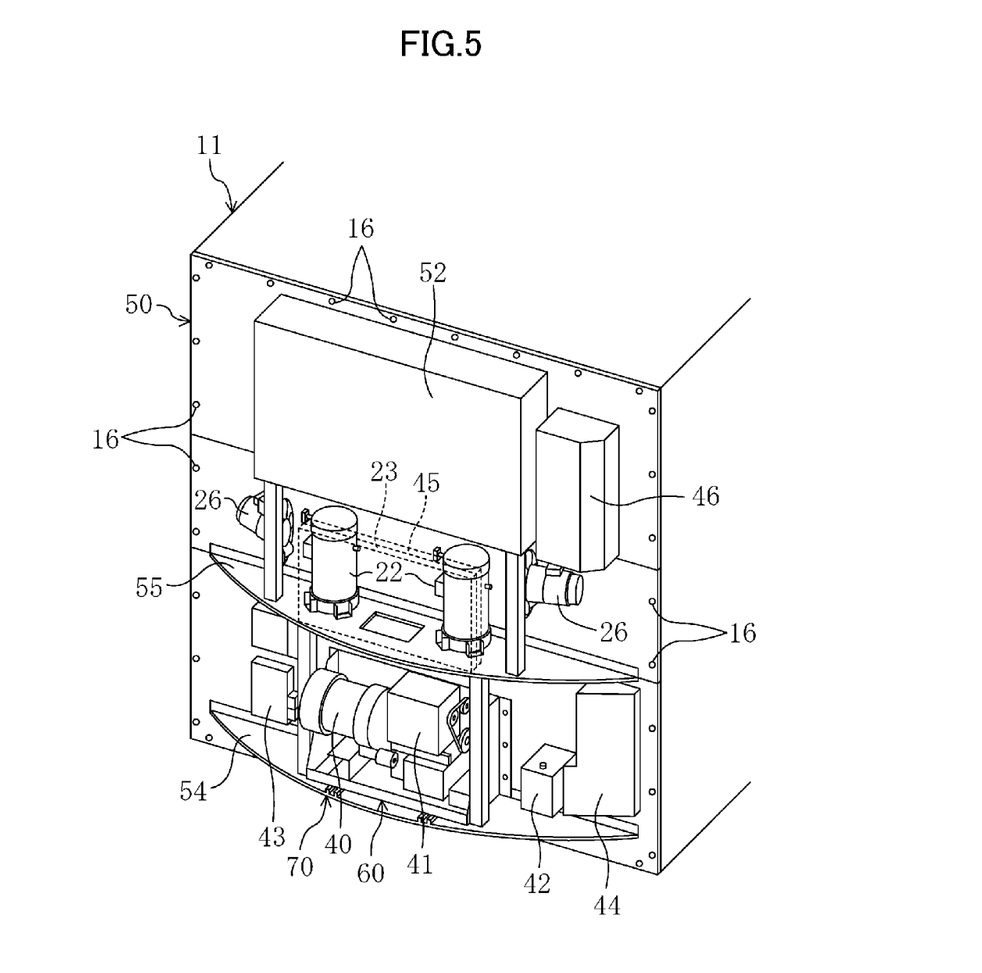
FIG. 5 is a perspective view illustrating the trailer refrigerating apparatus in a state in which a front cover is detached.

As illustrated in FIG. 5, in the first machine chamber (35), a generator (40), an engine (41), a battery (42), and a plurality of electric component boxes (43, 44) are provided. In addition, in the first machine chamber (35), an engine support (60) which will be described later is provided, and the generator (40) and the engine (41) are mounted on the engine support (60). The engine (41) is for driving the generator (40), and the generator (40) is for generating power for driving the compressors (22) etc. That is, in the first machine chamber (35), an engine generator is mounted, which is integrally formed by the generator (40) and the engine (41). In addition, in the first machine chamber (35), the first electric component box (43) is provided in a space at the left of the generator (40), and the second electric component box (44) is provided in a space at the right of the engine (41).

In the second machine chamber (36), the two compressors (22), the condenser (23), a radiator (45), the two outside-compartment fans (26), and an electric component box (46) are provided. Specifically, in the second machine chamber (36), the two compressors (22) are mounted in a middle position of the upper support member (55) in the right-left direction. In addition, the radiator (45) and the condenser (23) are arranged in the front of the compressors (22). The condenser (23) is arranged so as to extend between the two upper pillars (57). The middle inlet (32b) of the front cover (32) is positioned in the front of the condenser (23). The radiator (45) is arranged in the rear of the condenser (23), and serves as an air-cooling radiator for dissipating heat from the engine (41).

The two outside-compartment fans (26) are arranged so as to sandwich the two compressors (22). One of the two outside-compartment fans (26) is arranged closer to a left end of the upper support member (55), and the other outside-compartment fan (26) is arranged closer to a right end of the upper support member (55). The outside-compartment fan (26) is a so-called "propeller fan," and a rotation shaft thereof extends in the right-left direction. A propeller is connected to an end portion of the rotation shaft of the outside-compartment fan (26) closer to the compressor (22), and a motor is connected to an opposite end portion. In the second machine chamber (36), the third electric component box (46) is provided in a space closer to an upper right portion of the second machine chamber (36).

<In-Compartment Casing>

Figure 6:
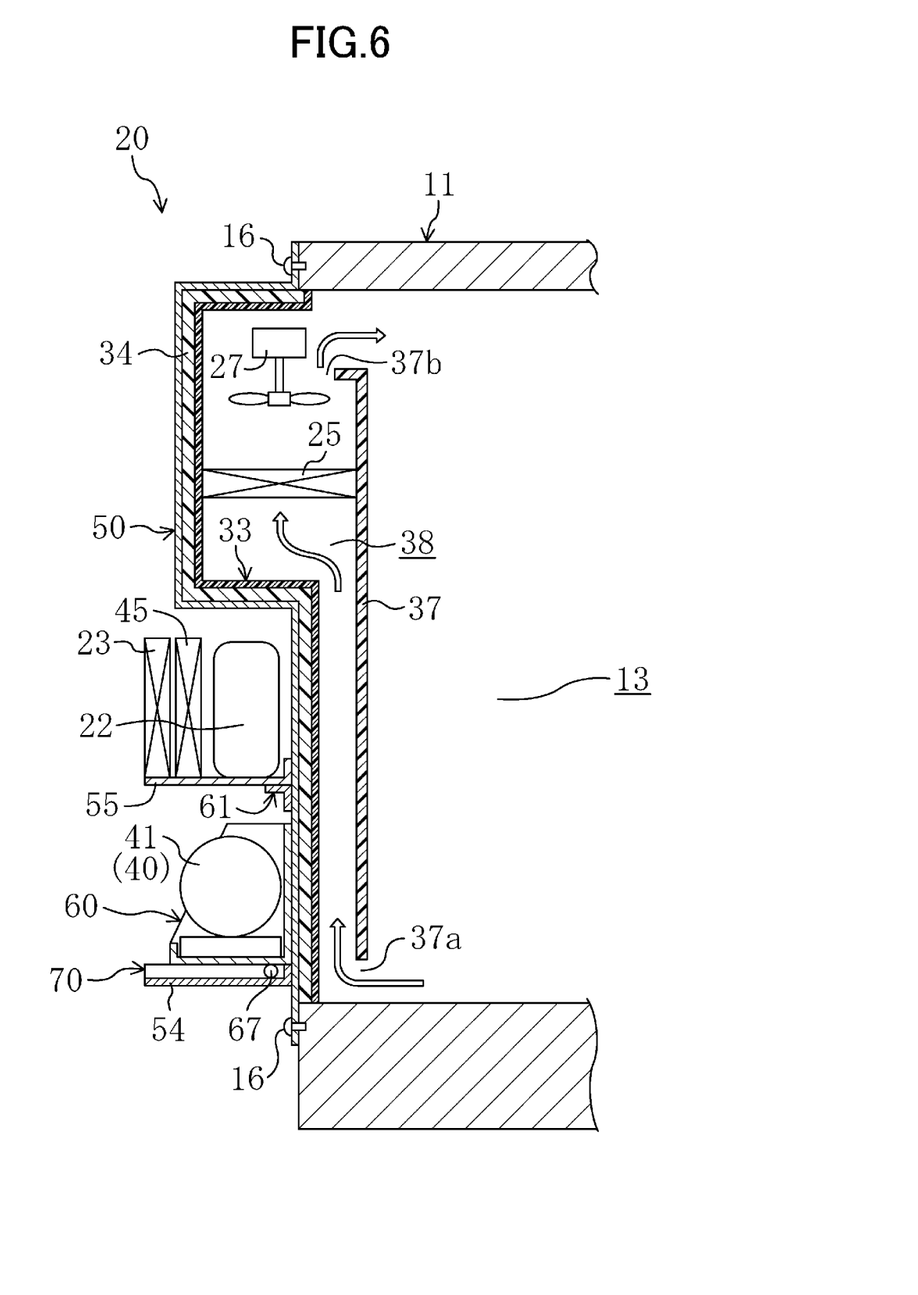
FIG. 6 is a longitudinal sectional view illustrating a schematic configuration of the trailer refrigerating apparatus.

As illustrated in FIG. 6, the in-compartment casing (33) is provided on a rear surface side of the outside-compartment casing (50) so as to face the in-compartment space (13) of the trailer (11). The in-compartment casing (33) is made of, e.g., a glass fiber reinforced plastic (FRP) material. Note that the in-compartment casing (33) may be made of, e.g., other rein material or a metal material. The in-compartment casing (33) has a shape defined along a rear surface of the outside-compartment casing (50).

A predetermined clearance is formed between a front surface of the in-compartment casing (33) and the rear surface of the outside-compartment casing (50), and a thermal insulator (34) is formed between the in-compartment casing (33) and the outside-compartment casing (50). After an enclosed space is formed between the outside-compartment casing (50) and the in-compartment casing (33), the enclosed space is filled with foamed resin, thereby integrally forming the thermal insulator (34) with the casing unit (31).

A partition (37) is attached on a rear surface side of the in-compartment casing (33). The partition (37) is arranged so as to apart from each of a rear surface of the in-compartment casing (33), an upper inner wall of the trailer (11), and a lower inner wall of the trailer (11) with a predetermined distance. This forms an inlet port (37a) below the partition (37), and forms an outlet port (37b) above the partition (37). In addition, an internal air flow path (38) is formed between the in-compartment casing (33) and the partition (37) so as to extend between the inlet port (37a) and the outlet port (37b).

In the internal air flow path (38), the evaporator (25) and the in-compartment fan (27) are provided. On the rear surface side of the protrusion (52), the evaporator (25) is arranged so as to extend between the in-compartment casing (33) and the partition (37), and is supported by the in-compartment casing (33). The in-compartment fan (27) is provided above the evaporator (25).

<Engine Generator Drawing Structure>

As described above, in the outside-compartment casing (50), the engine support (60) on which the engine (41) and the generator (40) are mounted is provided. Specifically, the engine support (60) is mounted on an upper surface of the lower support member (54) between the two lower pillars (56) (see FIG. 4).

Figure 4:
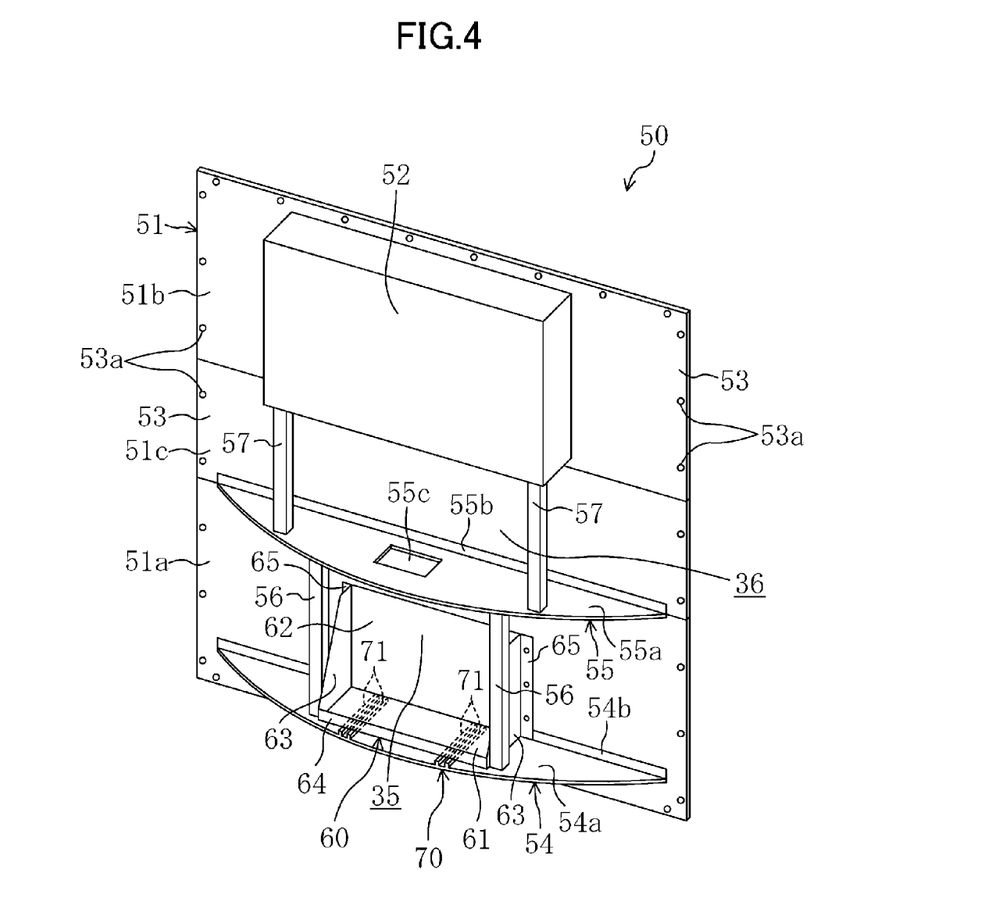
FIG. 4 is a perspective view of an outside-compartment casing.
Figure 8:
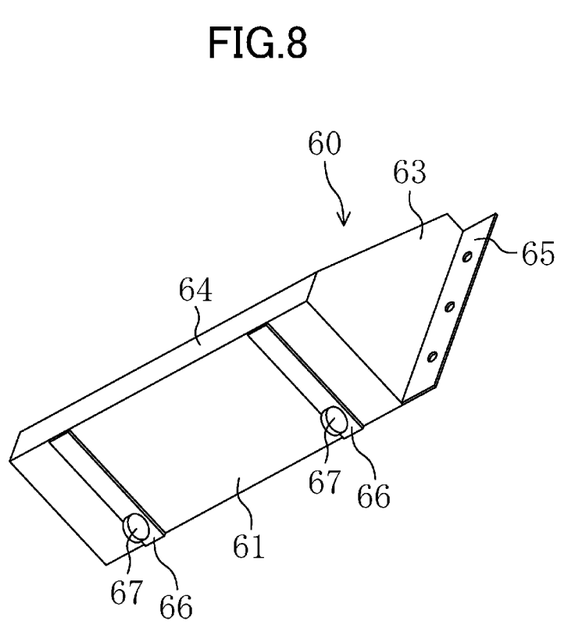
FIG. 8 is a perspective view of an engine support of an embodiment.

The engine support (60) of the present embodiment is in a box shape opening on an upper side and an upper front side, and an outer shape of the engine support (60) is a substantially triangular column shape (see FIGS. 4 and 8). In addition, the engine support (60) of the present embodiment is made of an aluminum material. The engine support (60) includes a bottom plate (61), a rear plate (62), a pair of side plates (63), a front frame plate (64), and a pair of attachment plates (65).

The bottom plate (61) is formed in a rectangular shape extending between the pair of lower pillars (56) in the right-left direction. A pair of wheel holding plates (66) and wheels (67) each held by the wheel holding plate (66) are provided on a lower surface (i.e., a lower portion of the engine support (60)) of the bottom plate (61). The wheel holding plate (66) is formed in, e.g., a plate-like shape extending in the front-back direction, and the wheel holding plates (66) are fixed to the lower surface of the bottom plate (61). The two wheel holding plates (66) are arranged parallel to each other at a predetermined interval. The wheel (67) is rotatable in a state in which an axial direction of the wheel (67) is along the right-left direction. Note that, in the present embodiment, the single wheel (67) is provided in each of the wheel holding plates (66), but two or more wheels (67) may be provided in each of the wheel holding plates (66).

The rear plate (62) is formed in a substantially rectangular shape. In the present embodiment, part of the base (51) is positioned in the rear of the rear plate (62), and a contact between the rear plate (62) of the engine support (60) and the base (51) is allowed. Note that, instead of the foregoing configuration, a configuration may be employed, in which an opening into which the rear plate (62) is fitted is formed in part of the base (51) in the rear of the rear plate (62) and such an opening is closed by the rear plate (62).

Each of the pair of side plates (63) is formed in a substantially right triangular shape so that an upper end portion and part of a front end portion of the side plate (63) are cut off to form flat surfaces. The bottom plate (61) is formed so as to extend between lower sides of the side plates (63), and the rear plate (62) is formed so as to extend between rear sides of the side plates (63). Further, the front frame plate (64) is formed so as to extend between front sides of the side plates (63) in the right-left direction.

One of the pair of attachment plates (65) outwardly protrudes from one of the side plates (63) to the right of the engine support (60), and the other attachment plate (65) outwardly protrudes from the other side plate (63) to the left of the engine support (60). Each of the attachment plates (65) is formed in an elongated plate-like shape extending from an upper end to a lower end of the engine support (60), and a contact between a rear surface of the attachment plate (65) and the base (51) is allowed. A contact surface between each of the attachment plates (65) and part of the base (51) corresponding to the each of the attachment plates (65) is fixed by fastening members. That is, by fixing each of the attachment plates (65) and the base (51) to each other by the fastening members or canceling the foregoing fixing state, the engine support (60) is attached/detached to/from the outside-compartment casing (50).

Two rail grooves (70) are formed in the upper surface of the lower support member (54). Each of the rail grooves (70) includes two rails (71). Each of the rails (71) is in a rod-like shape extending in the front-back direction, and is formed so as to have, e.g., a rectangular longitudinal section. A groove into which the wheel (67) is rotatably fitted is formed along the rails (71) between the adjacent two rails (71). That is, the rail grooves (70) are arranged below the engine support (60), and the wheels (67) are fitted into the rail grooves (70) extending in the front-back direction. Thus, the engine support (60) is drawable from the outside-compartment casing (50) in a forward direction relative a front side of the trailer (11). In addition, the rail groove (70) serves as a guiding member for guiding the engine support (60) in the front-back direction (described in detail later).

Operation

Figure 7:
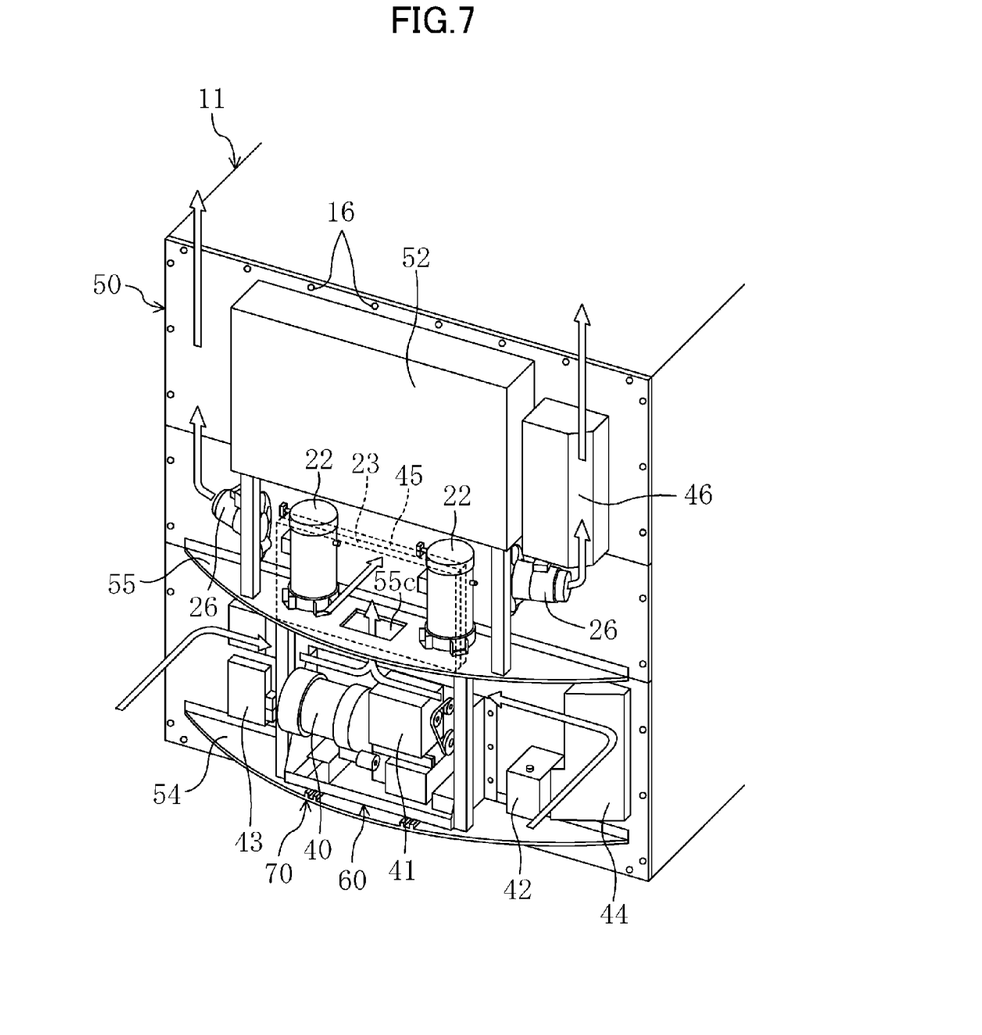
FIG. 7 is a perspective view illustrating the trailer refrigerating apparatus in the state in which the front cover is detached, and illustrates a flow of outdoor air.

Next, an operation of the trailer refrigerating apparatus (20) will be described with reference to FIGS. 6 and 7.

When the generator (40) is driven by the engine (41), power is generated in the generator (40). Such power is supplied to the compressors (22), the outside-compartment fans (26), and the in-compartment fan (27). In the refrigerant circuit (21), the compressors (22) are operated to perform the refrigeration cycle.

Specifically, refrigerant compressed in the compressors (22) flows through the condenser (23). In the condenser (23), the refrigerant is condensed by dissipating heat to outside-compartment air. The pressure of the condensed refrigerant is reduced when the refrigerant passes through the expansion valve (24), and the refrigerant after the pressure reduction flows through the evaporator (25). In the evaporator (25), the refrigerant is evaporated by absorbing heat from in-compartment air. The evaporated refrigerant is re-compressed in the compressors (22).

When the in-compartment fan (27) is operated, in-compartment air of the in-compartment space (13) is sucked into the internal air flow path (38) through the inlet port (37a). The air sucked into the internal air flow path (38) upwardly flows and passes through the evaporator (25). In the evaporator (25), the in-compartment air is cooled by exchanging heat with refrigerant. The in-compartment air cooled in the evaporator (25) flows in an in-compartment space (S) through the outlet port (37b), and is used for refrigerating/freezing freight etc.

Meanwhile, when the outside-compartment fan (26) is operated, outside-compartment (outdoor) air is sucked into the machine chambers (35, 36). Specifically, the outside-compartment air is sucked through the two side inlets (32c) and the middle inlet (32b) of the front cover (32). The air introduced into the first machine chamber (35) through the left one of the two side inlets (32c) passes around the first electric component box (43). Then, the air flows above the engine support (60), and is sent to the vicinity of the generator (40) and the engine (41). Meanwhile, the air introduced into the first machine chamber (35) through the right one of the two side inlets (32c) passes around the second electric component box (44). Then, the air flows above the engine support (60), and is sent to the vicinity of the engine (41) and the generator (40). When the air flows near the engine (41) and the generator (40), the engine (41) and the generator (40) are cooled by the air. The air used for cooling the engine (41) and the generator (40) upwardly flows through the communication port (55c), and is sent to the second machine chamber (36).

The air sucked into the second machine chamber (36) through the middle inlet (32b) passes through the condenser (23). In the condenser (23), refrigerant is condensed by dissipating heat to the outside-compartment air. The air passing through the condenser (23) flows around the radiator (45), and is used for cooling the radiator (45). Then, such air joins the air passing through the communication port (55c).

The air joined together in the second machine chamber (36) is distributed in right and left directions so as to flow around the two compressors (22). The air distributed in the left direction passes through an opening at an upper end of the front cover (32), and then is released to an outside of the outside-compartment casing (50). The air distributed in the right direction passes through the third electric component box (46). Then, such air passes through the opening at the upper end of the front cover (32), and is released to the outside of the outside-compartment casing (50).

Maintenance of Engine Generator

When maintenance of the engine (41) and the generator (40) is performed, the front cover (32) illustrated in FIG. 3 is first detached from the outside-compartment casing (50). Next, e.g., the pipes connected to the engine (41) and the generator (40) are removed. Subsequently, the fastening members are released in each of the attachment plates (65) of the engine support (60), and the engine support (60) is detached from the outside-compartment casing (50). When the engine support (60) is pulled toward the front in such a state, the wheels (67) rotate to move the engine support (60) toward the front. In such a manner, the engine support (60) is drawn out so that the wheels (67) move along the rail grooves (70), and therefore the engine (41) and the generator (40) having a relatively-high weight can be easily and smoothly drawn out toward the front.

Figure 9:
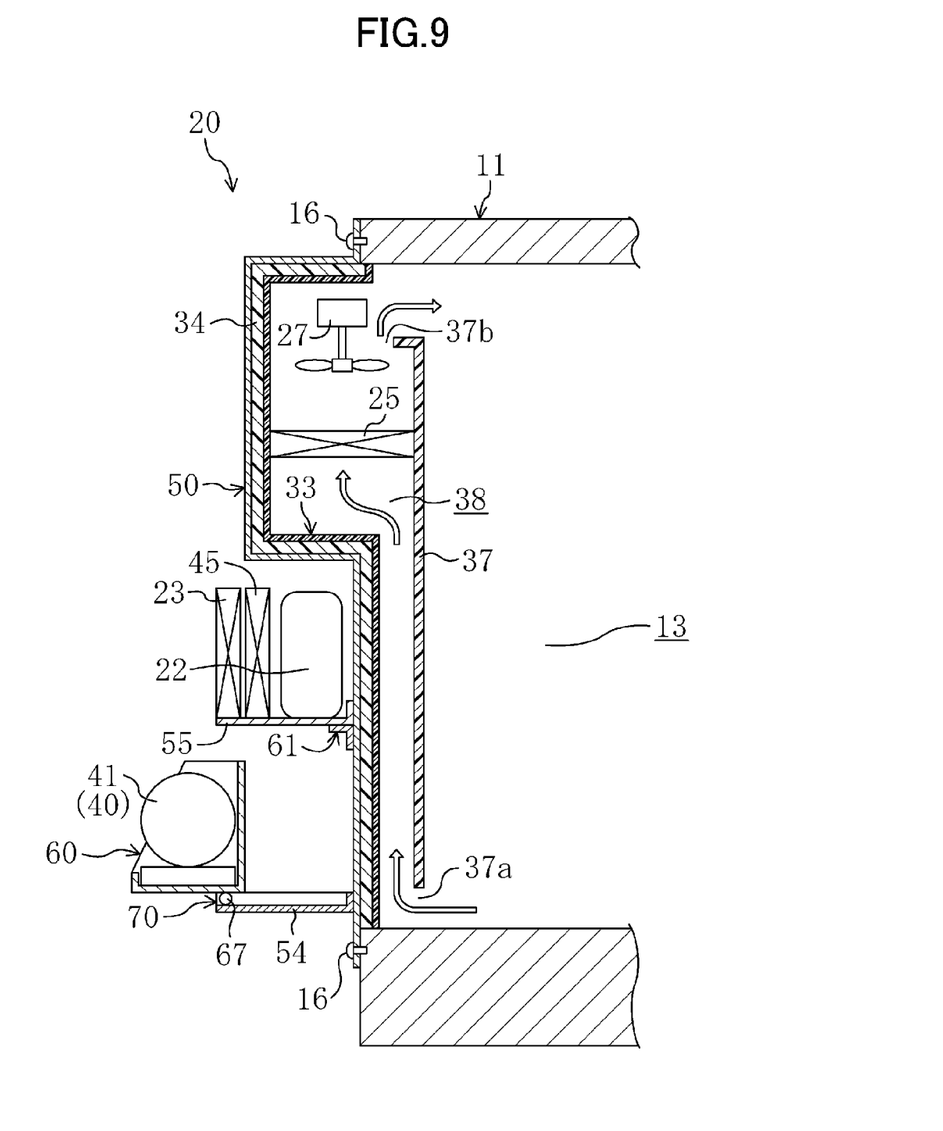
FIG. 9 is a longitudinal sectional view illustrating the schematic configuration of the trailer refrigerating apparatus, and illustrates a state in which the engine support is drawn out toward the front.

When the engine support (60) is drawn out toward the front from the outside-compartment casing (50) as described above, the engine (41) and the generator (40) are in a position protruding toward the front relative to the outside-compartment casing (50) as illustrated in FIG. 9. Thus, a predetermined portion (e.g., a portion corresponding to an injector) of the engine (41) and the generator (40) is less susceptible to obstacles such as the upper support member (55) and other components upon maintenance of such a predetermined portion.

After completion of the maintenance, the engine support (60) is pushed toward the back. This allows the wheels (67) to rotate, thereby moving the engine support (60) toward the back. In such a manner, the engine support (60) is pushed so that the wheels (67) move along the rail grooves (70), and therefore the engine (41) and the generator (40) having the relatively-high weight can be easily and smoothly pushed toward the back and can be returned to an original position.

Advantages of the Embodiment

In the foregoing embodiment, the engine (41) and the generator (40) having the relatively-high weight can be drawn out toward the front from the outside-compartment casing (50) together with the engine support (60). Thus, the engine (41) and the generator (40) are less susceptible to the obstacles such as the upper support member (55) and the other components of the outside-compartment casing (50) upon the maintenance of the engine (41) and the generator (40), thereby improving working efficiency for maintenance.

In particular, in the foregoing embodiment, the wheels (67) are provided below the engine support (60), and the wheels (67) are fitted into the rail grooves (70). Thus, the wheels (67) can rotate along the rail grooves (70), and therefore the engine support (60) can be easily drawn and/or pushed.

Further, since the engine support (60) is made of the aluminum material, the weight of the engine support (60) can be reduced. Thus, the engine support (60) can be more easily drawn and/or pushed.

Variation of the Embodiment

Figure 10:
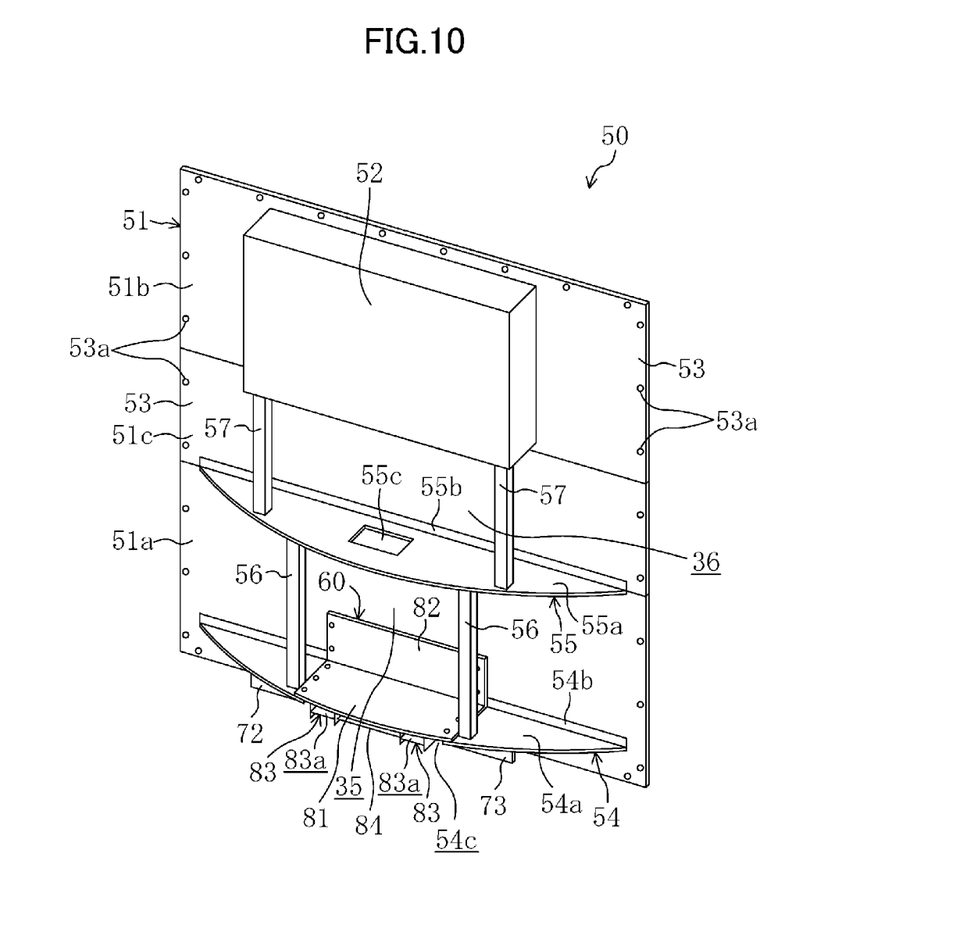
FIG. 10 is a perspective view of an outside-compartment casing of a variation.
Figure 11:
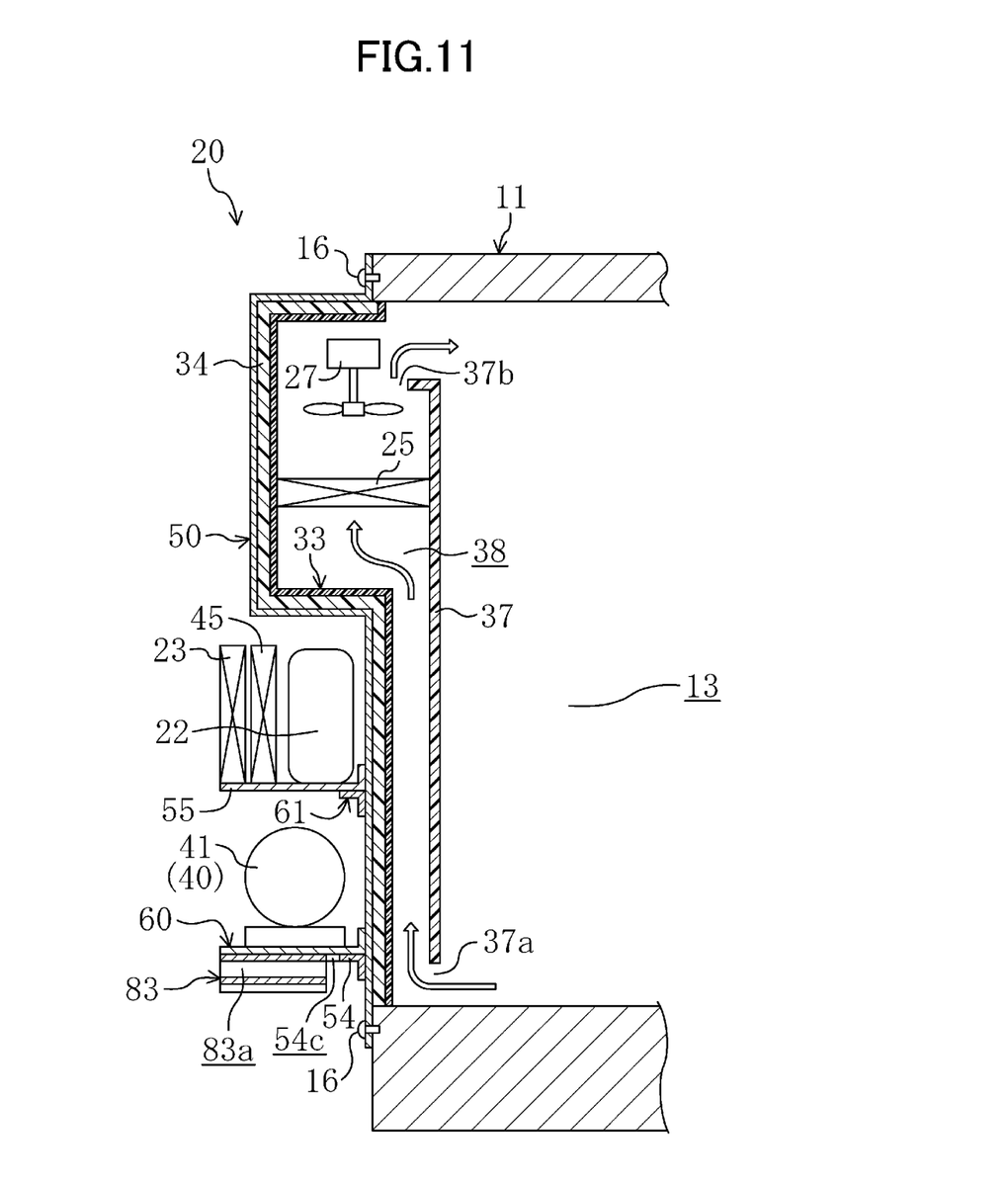
FIG. 11 is a longitudinal sectional view illustrating a schematic configuration of a trailer refrigerating apparatus of the variation.
Figure 12:
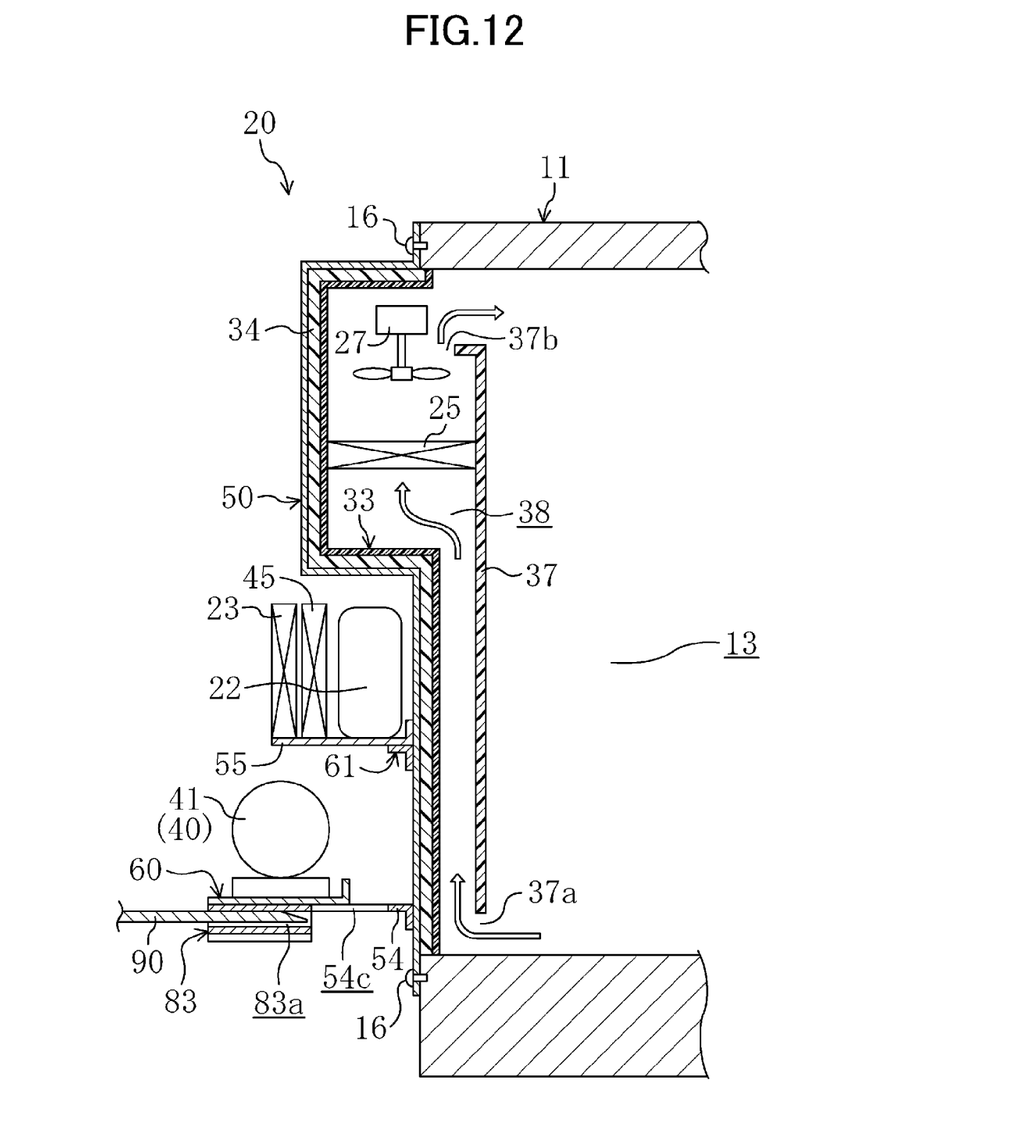
FIG. 12 is a longitudinal sectional view illustrating the schematic configuration of the trailer refrigerating apparatus of the variation, and illustrates a state in which an engine support is drawn out toward the front.

A variation of the foregoing embodiment will be described with reference to FIGS. 10-12. The lower support member (54) of the variation is in a shape in which a protrusion (middle portion) of the lower support member (54) is cut off. That is, the lower support member (54) of the variation is formed so as to have a cut-off space (54c) in a middle position of the lower support member (54) in a longitudinal direction. In addition, a first rib (72) is formed in a left portion below the lower support member (54) of the variation, and a second rib (73) is formed in a right portion below the lower support member (54) of the variation.

The engine support (60) of the variation has a configuration different from that of the foregoing embodiment. Specifically, the engine support (60) includes a bottom plate (81) and a rear plate (82). The bottom plate (81) is formed in a rectangular shape extending between the two lower pillars (56). The bottom plate (81) extends between right and left portions of the lower support member (54) so as to close the cut-off space (54c). Although not shown in FIG. 10, the generator (40) and the engine (41) are mounted on the bottom plate (81). The rear plate (82) is configured so that a contact between the rear plate (82) and the base (51) is allowed.

In the engine support (60) of the variation, right and left end portions of each of the bottom plate (81) and the rear plate (82) are fixed by fastening members. That is, the bottom plate (81) of the engine support (60) is fastened to the lower support member (54), and the rear plate (82) of the engine support (60) is fastened to the base (51). In such a manner, the engine support (60) is fixed to the outside-compartment casing (50).

A pair of fork pockets (83) are provided below the engine support (60). The fork pocket (83) is formed in a substantially cylindrical shape extending in the front-back direction, and an internal space (83a) is formed inside the fork pocket (83). A longitudinal section (cross section perpendicular to an axis) of the internal space (83a) is in a rectangular shape with substantially flat upper and lower surfaces. The internal space (83a) serves as an engagement hole to be engaged with a fork of a forklift. A middle rib (84) extending in the right-left direction is provided between the fork pockets (83).

In the variation, when the maintenance of the engine (41) and the generator (40) is performed, the front cover (32) is first detached, and then, e.g., the pipes connected to the engine (41) and the generator (40) are removed as in the foregoing embodiment. Subsequently, in the engine support (60), the fastening members of the bottom plate (81) and the rear plate (82) are removed, and the engine support (60) is detached from the outside-compartment casing (50).

In such a state, each of a pair of forks (90) provided in the forklift is inserted into each of the fork pockets (83) of the engine support (60). Thus, as illustrated in FIG. 12, the engine support (60) can be lifted by the forks (90) of the forklift, and can be drawn out toward the front. Consequently, the engine (41) and the generator (40) can be held in the position protruding toward the front relative to the outside-compartment casing (50), thereby improving the working efficiency for maintenance of the engine (41) and the generator (40).

Note that the foregoing embodiment has been set forth merely for purposes of preferred examples in nature, and is not intended to limit the present invention or the application or scope thereof.

INDUSTRIAL APPLICABILITY

As described above, the present invention is useful for the trailer refrigerating apparatus for cooling the in-compartment space of the trailer.

DESCRIPTION OF REFERENCE CHARACTERS

11 Trailer
13 In-Compartment Space
14 Opening
20 Trailer Refrigerating Apparatus
20a Cooling Unit
25 Evaporator (Cooling Section)
31 Casing Unit (Casing)
50 Outside-Compartment Casing (Main Body)
60 Engine Support
67 Wheel
70 Rail Groove (Guiding Member)
83a Internal Space

The invention claimed is:

1. A trailer refrigerating apparatus, comprising:
   a casing attached to an opening on a front side of a trailer, the casing having a first engine chamber and a second engine chamber;
   a radiator and a condenser arranged in front of at least one compressor, where the radiator, the condenser and the at least one compressor are located in the second engine chamber;
   a cooling unit configured to cool air in an in-compartment space of the trailer; and
   an engine generator configured to supply power to the cooling unit,
   wherein the casing includes an engine support which is fixed to a main body of the casing and on which the engine generator is mounted,
   the engine support is drawable from the main body of the casing in a forward direction relative to the front side of the trailer,
   a front cover is provided, which is detachably attached to a front side of the casing and which forms a side of the first machine chamber in which the engine generator, the engine support, and two electric components provided respectively on both sides of the engine support are located,
   two side inlets communicating with the first machine chamber are formed in the front cover,
   at the front cover, an inlet is formed in front of the radiator and the condenser in the second engine chamber,
   the engine support includes
      a bottom plate on which the engine generator is mounted,
      a rear plate provided in rear of the engine generator, and
      a pair of side plates provided respectively on both sides of the engine generator so as to extend across the bottom plate and the rear plate and each formed in a triangular shape such that an upper end portion and a front end portion thereof are cut off,
   a plate is provided to define the first and second machine chambers on upper and lower sides thereof, and is provided with a communication port through which the first and second machine chambers communicate with each other,
   air introduced into the first machine chamber through each side inlet passes through a corresponding one of the electric components and the engine generator in this order and upwardly flows through the communication port to the second machine chamber,
   a discharge port is formed between the front cover and an upper edge of the casing, and
   a fan is disposed such that
      air of the first machine chamber is sucked into the second machine chamber through the communication port,
      outdoor air is sucked into the second machine chamber through the inlet, and
      each of the air sucked through the communication port and the air sucked through the inlet is discharged upwardly to outside of the casing through the discharge port.

2. The trailer refrigerating apparatus of claim 1, wherein a guiding member for guiding the engine support in a front-back direction is provided in the casing.

3. The trailer refrigerating apparatus of claim 2, wherein a wheel is provided below the engine support, and
   the guiding member is arranged below the engine support and includes a rail groove which extends in the front-back direction and into which the wheel is fitted.

4. The trailer refrigerating apparatus of claim 1, wherein an internal space extending in a front-back direction and having a substantially rectangular longitudinal section is formed below the engine support.

5. The trailer refrigerating apparatus of any one of claims 1-4, wherein the engine support is made of an aluminum material.

* * * * *